(12) United States Patent
DiChiara, Jr. et al.

(10) Patent No.: US 6,676,077 B1
(45) Date of Patent: Jan. 13, 2004

(54) HIGH TEMPERATURE RESISTANT AIRFOIL APPARATUS FOR A HYPERSONIC SPACE VEHICLE

(75) Inventors: Robert A. DiChiara, Jr., Carlsbad, CA (US); Robert E. French, San Gabriel, CA (US); Conley Siddoway Thatcher, Placentia, CA (US); Edward A. Zadorozny, Redondo Beach, CA (US); Peter A. Hogenson, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 263 days.

(21) Appl. No.: 09/703,947

(22) Filed: Nov. 1, 2000

(51) Int. Cl.⁷ .................................................. B64G 1/00
(52) U.S. Cl. .......................... 244/117 R; 244/158 A; 244/123; 244/133
(58) Field of Search .................. 244/158 A, 123, 244/117 R, 87, 124, 133; 428/319.3, 318.4, 319.7

(56) References Cited

U.S. PATENT DOCUMENTS

| | | | | |
|---|---|---|---|---|
| 3,145,000 A | * | 8/1964 | Mackie | |
| 4,095,322 A | * | 6/1978 | Scarpati et al. | |
| 4,411,380 A | * | 10/1983 | McWithey et al. | |
| 4,671,471 A | * | 6/1987 | Patmont | |
| 4,713,275 A | * | 12/1987 | Riccitiello et al. | |
| 4,927,714 A | * | 5/1990 | Priceman | |
| 5,277,958 A | * | 1/1994 | Tomkins | |
| 5,511,747 A | * | 4/1996 | Parrot et al. | |
| 5,560,569 A | * | 10/1996 | Schmidt | |

* cited by examiner

Primary Examiner—Tien Dinh
(74) Attorney, Agent, or Firm—Harness, Dickey & Pierce, P.L.C.

(57) ABSTRACT

A ruddervator for an aerospacecraft including a monolithic, one-piece, oxide/oxide-based ceramic matrix composite (Oxide-CMC) shell having a hollowed interior area. A graphite composite structural member is inserted into the hollowed interior area and bonded thereto. The Oxide-CMC shell is comprised of one or more plies of Oxide-CMC fabric which are fused over a thick substrate of rigid ceramic foam insulation to form the monolithic shell. An outer mold line ply of the Oxide-CMC shell is further infused with a high-emissivity coating such as reaction-cured glass (RCG) to provide plasma heating re-radiation outward to reduce internal temperatures in the ruddervator. A torque box transition structure is secured to the graphite composite structural member to interface the ruddervator to a fuselage actuator spindle of the aerospacecraft. The ruddervator is reusable and formed from a reduced number of independent component parts, and weighs less than previously developed ruddervators. The manufacturing cost of the ruddervator is reduced by utilizing the reduced tooling complexities of Oxide-CMC over CMC fabrication processes.

14 Claims, 2 Drawing Sheets

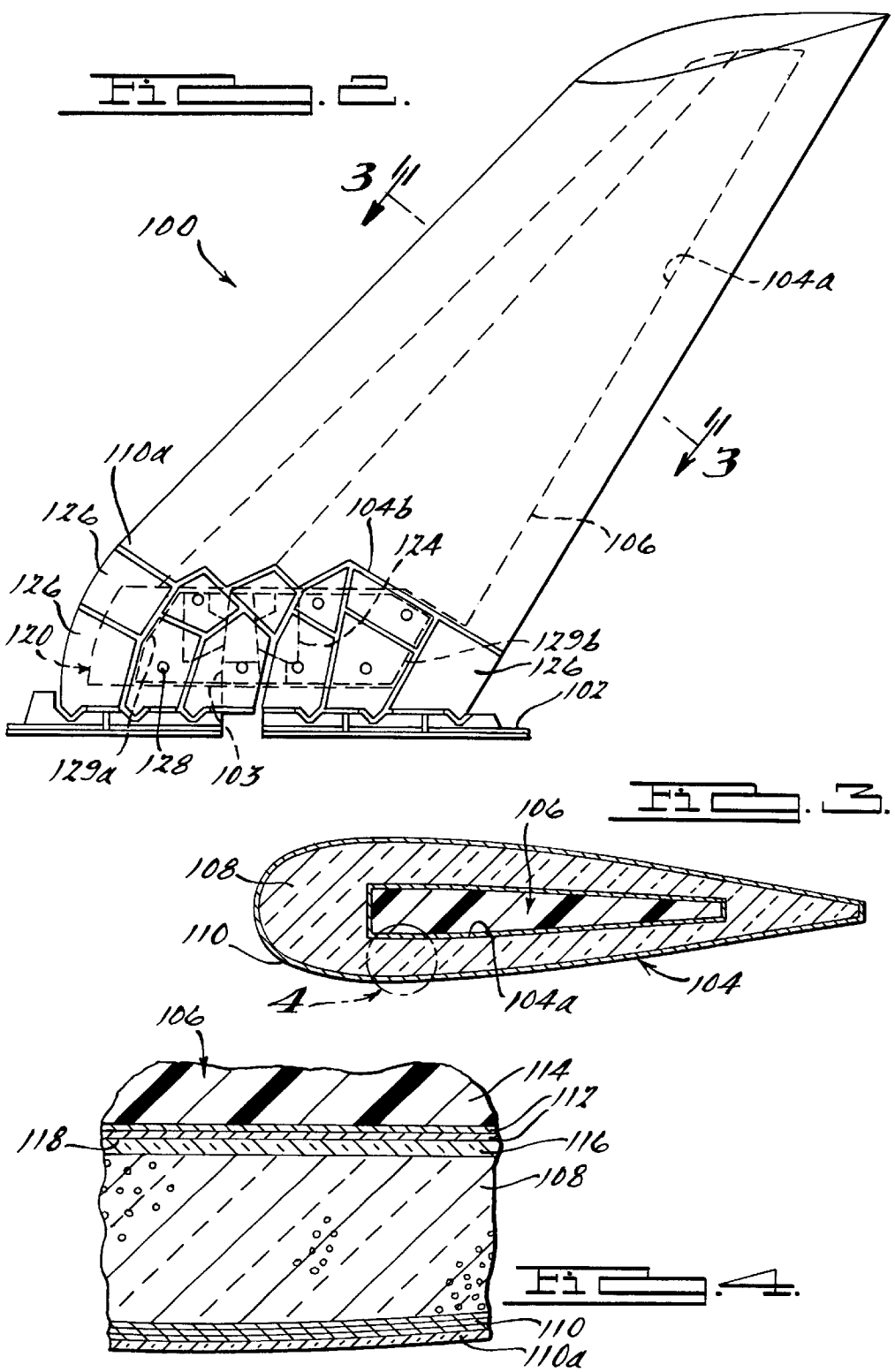

HIGH TEMPERATURE RESISTANT AIRFOIL APPARATUS FOR A HYPERSONIC SPACE VEHICLE

TECHNICAL FIELD

This invention relates to control surfaces for aerospacecraft, and more particularly to a ruddervator for an aerospacecraft incorporating a single piece, temperature resistant ceramic matrix composite shell secured over a composite structural member, wherein the structural member is adapted to be secured to a control element of the aerospacecraft.

BACKGROUND OF THE INVENTION

Current control surfaces for advanced aerospacecraft are formed by a carbon-based ceramic matrix composite (CMC) hot structure with conventional rib-stiffened structure and a mechanically fastened skin. The X-37 aerospacecraft presently in use uses a control surface termed a "ruddervator" with the above-described construction, and makes use of carbon/silicon carbide (C/SiC). This construction is shown in FIG. 1. The mechanically fastened upper skin 10 is secured by a high temperature metal, ceramic or ceramic composite fasteners at locations 12 to an integral C/SiC lower skin and substructure 14. A C/SiC tail tip 16 is used to close the end of the ruddervator. A titanium spindle 16 is used to rotate the ruddervator as needed. Thermal protection system seals 18, 20 and ring 22 are used to help mount the ruddervator to the fuselage of the aerospacecraft.

The X-37 ruddervator approach described above uses an expensive 2800° F. CMC system in a 2400° F. "hot structure" application and uses an aircraft-like structural approach at the elevated temperature. The term "hot structure" refers to the temperature of the primary load-carrying structure, in this case the CMC and supports used at 2400° F. This construction reduces the service life of the fasteners. Additionally, carbon-based CMCs generally require complex and costly tooling, unique and expensive infiltration/furnace facilities, and fabrication cycles of six months or more. The use of new materials under development, such as oxide fibers/oxide-matrix based CMC (oxide-CMC), provide opportunities to design control surfaces in novel and more cost-effective ways including, but not limited to, maintaining internal supports and attachments below 600° F.

For present and planned reusable hypersonic vehicles there are also size constraints on control surfaces due to available volume which restrict the use of conventional, lower cost structure insulated with bonded tile thermal protection. The current solution is to use the CMC for control surface hot structure in areas which do not require their extreme high temperature properties. The result is high initial and recurring costs for these parts as well as weight penalties and high part counts. Without an order of magnitude reduction in thermal structure costs, commercial reusable access to space will be difficult, if not impossible, to achieve.

It is therefore a principal object of the present invention to provide a new construction for a ruddervator for an aerospacecraft which can be produced more inexpensively from a simpler fabrication process, and which has improved life and reliability over the conventional mechanically fastened upper skin-to-substructure approach presently in use for ruddervator applications.

It is another object of the present invention to provide a hybrid control surface for an aerospacecraft which can be manufactured more economically, which is simpler to repair, and which does not make use of typical mechanical fasteners to secure an upper skin to a substructure.

It is still another object of the present invention to provide a ruddervator for an aerospacecraft having a simplified design which requires significantly fewer independent component parts being needed in the construction of the ruddervator.

It is a further object of the present invention to provide a ruddervator for an aerospacecraft which can be constructed even more cost effectively, and which is reusable.

It is still another object of the present invention to provide a ruddervator for an aerospacecraft wherein the ruddervator employs a one piece, highly temperature resistant outer shell which is bonded to a composite structural member to provide a highly temperature resistant, lightweight and yet easy to manufacture assembly.

SUMMARY OF THE INVENTION

The above and other objects are provided by an airfoil in accordance with preferred embodiments of the present invention. The airfoil is specifically adapted to withstand the high temperatures encountered during hypersonic flight and is particularly suited for use as a ruddervator on an aerospacecraft.

The airfoil is comprised of a temperature resistant, ceramic matrix composite shell having an opening at one end and a hollowed out interior area. A structural member is inserted into the hollowed out interior area and bonded to an interior surface of the shell to form a structurally rigid airfoil assembly. A transition structure is secured to the structural member for interfacing the airfoil assembly to a control element of the space vehicle to permit the airfoil assembly to be controlled by the control element.

In one preferred embodiment the shell is comprised of a one-piece, oxide/oxide-based ceramic matrix composite (Oxide-CMC) shell. The structural member comprises a graphite composite structure having a graphite composite face sheet and a honeycomb core element.

During manufacture, the structural member is inserted into the hollowed out opening of the Oxide-CMC shell and is bonded thereto. The transition structure may be secured to the structural member either after the structural member is inserted into the shell or before attachment of the structural member to the shell. Finally, the transition structure is secured to a fuselage actuator spindle of the aerospacecraft.

The airfoil apparatus of the present invention thus forms a highly temperature resistant, easy to manufacture assembly. The assembly further reduces the cost and weight over present day ruddervator designs as a result of reducing the total number of parts required to form the ruddervator, in addition to providing a higher specific strength and stiffness of the materials used with the present invention.

BRIEF DESCRIPTION OF THE DRAWINGS

The various advantages of the present invention will become apparent to one skilled in the art by reading the following specification and subjoined claims and by referencing the following drawings in which:

FIG. 2 is a side view of a ruddervator of an aerospacecraft in accordance with a preferred embodiment of the present invention;

FIG. 3 is a cross sectional end view of the ruddervator of FIG. 2 taken in accordance with section line 3—3 in FIG. 2; and FIG. 4 is an enlarged view of a portion of the ruddervator of FIG. 3 corresponding to circled area 4 in FIG. 3.

DETAILED DESCRIPTION OF THE PREFERRED EMBODIMENTS

Figure 1:
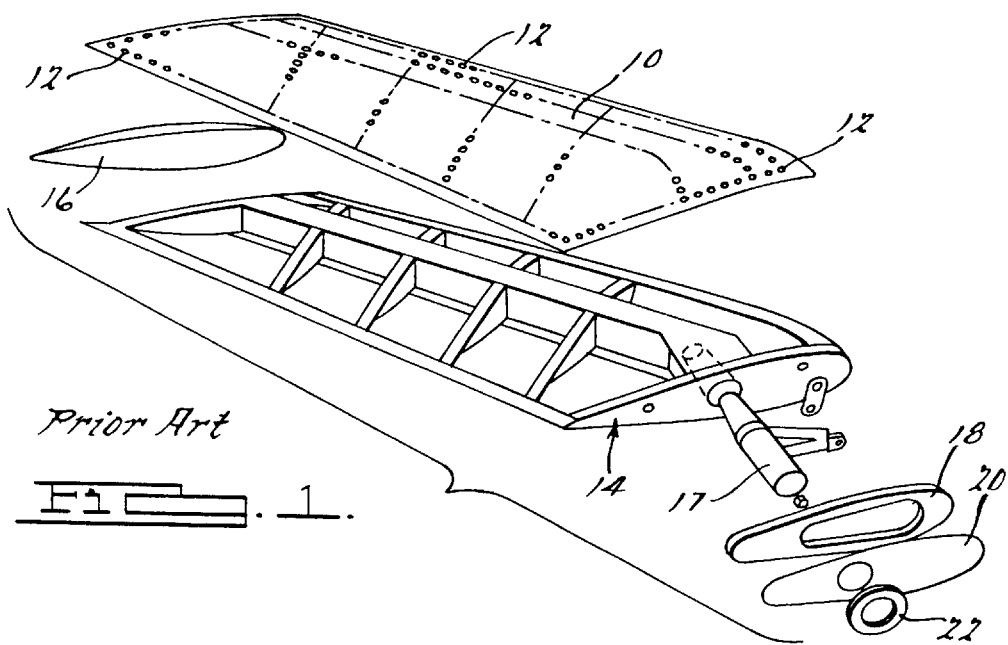
FIG. 1 is an exploded perspective view of a prior art ruddervator.

Referring to FIG. 2, there is shown a ruddervator 100 for a hypersonic vehicle such as an aerospacecraft. The ruddervator 100 is secured to a fuselage actuator spindle 103 of an aerospacecraft 102 so as to be movable by the spindle.

With reference to FIGS. 2–4, the ruddervator 100 includes a shell 104 and an internal structural member 106. The shell 104 is formed as a single-piece, monolithic structure having a hollowed out portion 104a. The shell 104 is comprised of a highly temperature resistant material, such as oxide/oxide-based ceramic matrix composite (Oxide-CMC) fabric 110 fused over a substrate of rigid ceramic foam insulation 108. Preferably, a plurality of plies of Oxide-CMC fabric are incorporated, with the outer mold line (OML) ply being infused with a high-emissivity coating 110a such as reaction-cured glass (RCG). The high-emissivity coating provides plasma heating reradiation outward to reduce internal temperatures within the ruddervator 100.

With further reference to FIGS. 3 and 4, the structural member 106 comprises one or more graphite composite face sheets 112, such as graphite/epoxy, and a honeycomb core 114. The honeycomb core 114 may be formed from Nomex®, commercially available from E. I. du Pont de Nemours and Company. The hollowed out portion 104a is formed in the foam insulation 108 to permit the direct room temperature vulcanizing (RTV) adhesive bonding, as indicated at 116, of the inner mold line 118 of the foam insulation onto the graphite face sheet 112 of the structural member 106. The Oxide-CMC face sheets 110 provide a continuous shear flow around the OML of the ruddervator and, in concert with the directly bonded graphite composite structural member 106, provide a quasi-torque box structure. The low thermal expansion property of the graphite minimizes the thermal mechanical stresses experienced due to thermal expansion differences between the ceramic foam insulation 108 and the structural member 106.

With further reference to FIG. 2, the ruddervator 100 includes a torque box transition structure 120 for interfacing the ruddervator 100 to the fuselage actuator spindle 103 of the aerospacecraft 102. The torque box transition structure 120 is sized to be slightly longer and wider than the graphite composite structural member 106 to provide space for fittings to attach the end of the member to the transition structure. The torque box transition structure 120 consists of a honeycomb sandwich torque box 122 with an access panel 124. The access panel 124 allows access to the lower end of the graphite composite structural member 106 and also to machined internal fittings on the transition structure 120 to permit attachment of the ruddervator 100 to the actuator spindle. To limit the temperature of the transition structure 120 to a maximum temperature of about 250° F.–500° F., the transition structure is covered with a plurality of external, rigid insulation tiles 126. Due to the lower temperatures at the base 100a of the ruddervator 100, current or advanced tile systems can be utilized such as RCG and toughened uni-piece fibrous insulation (TUFI) coated alumina-enhanced thermal barrier (AETB) tile. The tile over the transition structure 120 is attached using standard RTV, strain isolation pads (SIP) and fillerbar (F/B). However, to provide access to the spindle axis panel 124 and the attachments for the graphite composite structural member 106, specific tiles 126 are preferably bonded to intermediate carrier panels 129a and 129b and specific tiles have removable ceramic plugs 128 for access to carrier panel fasteners. The carrier panels are preferably fastened to inserts in the honeycomb sandwich transition structure 120 and thus permit easier removal of the tiles for damage replacement.

The ruddervator 100 also includes a serrated shape at a base portion 104b of the Oxide-CMC shell 104. The tiles 126 at the interface of the Oxide-CMC shell 104 and the torque box transition structure 120 match the serrated end of the Oxide-CMC shell. The serrated interface minimizes direct high temperature plasma flow to the aft portions of the ruddervator 100. It also permits direct access to the graphite composite structural member 106 when the transition structure 120 tile 126 are removed so that side attachments (not shown) between structural member 106 and structure 120 can be accessed.

It is an important advantage of the ruddervator 100 that the Oxide-CMC shell 104 is formed with the hollowed out interior area 104a defined by the outer mold line of the graphite composite structural member 106 in FIG. 3. This hollowed out interior area 104a allows a monolithic Oxide-CMC slab of material to be used to form the Oxide-CMC shell 104, and allows insertion of the graphite composite structural member 106 into the hollowed out area and subsequent direct bonding of the shell to the structural member.

To further improve the structural integrity of the ruddervator 100, the graphite composite structural member 106 preferably has a slight wedge shape, as indicated in FIG. 2, and also comprises open angles in all three dimensions, as indicated in FIG. 3. This feature permits air to escape during insertion of the structural member 106 into the hollowed out opening 104a of the Oxide-CMC shell 104 during manufacture to minimize the amount of air trapped in the RTV bond line 116 (FIG. 4). Excessive amounts of trapped air would reduce bond line strength to below acceptable levels. The wedge shape also permits pressure to be applied to the exposed end of the graphite composite structural member 106 and distributed throughout the Oxide-CMC shell 104 during bond curing to increase the adhesive joint strength and further reduce trapped air. The wedge shaped feature also provides an increasing thickness of CMC insulation between the outer mold line and inner mold line of the Oxide-CMC shell 104 to match the increasing temperature gradient to the ruddervator tip 100b (FIG. 2), while at the same time optimizing the ruddervator 100 overall structure to minimize weight. However, the individual panel surfaces creating the wedge shaped structural member 106 are all flat to minimize panel fabrication costs with the aerodynamic outer mold line insulation 108 cast directly into the Oxide-CMC.

The Oxide-CMC insulation 108 is further preferably uncoated at the open end (i.e. at serrated edge 104b) to allow the shell to vent during ascent. This reduces the risk of material fracture due to trapped air pressure differentials inside the insulation 108.

The ruddervator 100 of the present invention provides an assembly of reduced cost and weight over present day ruddervator constructions by reducing the total number of parts required and by using higher specific strength and stiffness materials. The number of independent parts is significantly reduced by the use of the Oxide-CMC shell 104 and the single graphite composite structural member 106, as compared with numerous built-up pieces of CMC hot structure and/or the traditional cold structure covered with numerous external tiles. The cost of the ruddervator 100 is also reduced by utilizing the reduced tooling complexities of Oxide-CMC over CMC fabrication processes, as well as the ability to implement more simple repair processes. Eliminating the need for oxidation protection coatings on the ruddervator also improves its life and reliability.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A high temperature resistant airfoil apparatus for a hypersonic space vehicle, comprising:
   a one-piece temperature resistant ceramic matrix composite shell having an opening at one end and a hollowed interior area extending substantially a full length of said matrix composite shell;
   a structural member inserted into said hollowed interior area so as to substantially fully occupy said hollowed interior area; and
   an insulation structure disposed within said hollowed interior area so as to at least partially surround said structural member; and
   a transition structure secured to said structural member for interfacing said airfoil apparatus to a control element of said space vehicle to permit said airfoil apparatus to be controlled by said control element.

2. The apparatus of claim 1, wherein said shell comprises an oxide/oxide-based ceramic matrix composite (Oxide-CMC) shell.

3. The apparatus of claim 2, wherein a top outer mold line (OML) ply of said Oxide-CMC shell is infused with a high-emissivity coating.

4. The apparatus of claim 1, wherein said structural member comprises a graphite composite structural member having a graphite composite facesheet and a honeycomb core element.

5. The apparatus of claim 1, further comprising a plurality of thermal barrier tiles secured over said transition structure.

6. The apparatus of claim 2, wherein said shell comprises an Oxide-CMC fabric fused to an outer surface of a rigid ceramic foam insulation member; and
   wherein said insulation member is RTV bonded to said structural member.

7. The apparatus of claim 1, wherein said structural member is wedge-shaped when viewed chord-wise to help eliminate air being trapped within said hollowed interior area of said shell as said structural member is inserted into said hollowed interior area during manufacturing of said airfoil.

8. The apparatus of claim 1, wherein said structural member is wedge-shaped when viewed from one side thereof to help eliminate air being trapped within said hollowed interior area of said shell as said structural member is inserted therein during manufacturing of said airfoil.

9. The apparatus of claim 1, wherein a lower end of said shell comprises a serrated edge to minimize high temperature flow to an aft portion of said airfoil apparatus.

10. A high temperature resistant ruddervator apparatus for a hypersonic space vehicle, comprising:
    a one piece, temperature resistant oxide/oxide-based ceramic matrix composite (Oxide-CMC) shell having an opening at one end and a hollowed interior area, said Oxide-CMC shell comprising an Oxide-CMC fabric fused to a rigid ceramic foam insulation member;
    a structural member inserted into said hollowed interior area of said Oxide-CMC shell and bonded to an interior surface of said Oxide-CMC shell to form a structurally rigid ruddervator assembly; and
    a transition structure secured to said structural member for interfacing said ruddervator assembly to a control element of said space vehicle to permit said ruddervator assembly to be controlled by said control element.

11. The apparatus of claim 10, wherein said structural member comprises a graphite composite structural member having a graphite/epoxy facesheet secured to a honeycomb core element.

12. The apparatus of claim 10, wherein said Oxide-CMC fabric is comprised of a plurality of plies of Oxide-CMC fabric fused to an outer surface of said rigid ceramic foam insulation member.

13. The apparatus of claim 10, wherein an outer surface of said Oxide-CMC fabric is infused with a high emissivity coating to reduce internal temperatures experienced by said rigid ceramic foam insulation and said structural member.

14. The apparatus of claim 13, wherein said high emissivity coating comprises reaction cured glass (RCG).

* * * * *